(12) United States Patent
Van Phan et al.

(10) Patent No.: US 9,312,946 B2
(45) Date of Patent: Apr. 12, 2016

(54) GATEWAY FUNCTIONALITY FOR MOBILE RELAY SYSTEM

(75) Inventors: Vinh Van Phan, Oulu (FI); Kari Veikko Horneman, Oulu (FI); Simone Redana, Munich (DE); Bernhard Raaf, Neuried (DE); Hanns Juergen Schwarzbauer, Gröbenzell (DE); Matti Einari Laitila, Oulu (FI); Seppo Vesterinen, Oulunsalo (FI); Alexander Vesely, Feldbach (AT)

(73) Assignee: Nokia Solutions and Networks Oy, Espoo (FI)

( * ) Notice: Subject to any disclaimer, the term of this patent is extended or adjusted under 35 U.S.C. 154(b) by 90 days.

(21) Appl. No.: 14/126,879

(22) PCT Filed: Jun. 17, 2011

(86) PCT No.: PCT/EP2011/060148
§ 371 (c)(1),
(2), (4) Date: Feb. 10, 2014

(87) PCT Pub. No.: WO2012/171585
PCT Pub. Date: Dec. 20, 2012

(65) Prior Publication Data
US 2014/0204832 A1 Jul. 24, 2014

(51) Int. Cl.
| | |
|---|---|
| *H04W 40/22* | (2009.01) |
| *H04B 7/15* | (2006.01) |
| *H04W 88/10* | (2009.01) |
| *H04W 16/26* | (2009.01) |
| *H04W 84/00* | (2009.01) |
| *H04W 84/04* | (2009.01) |
| *H04W 88/04* | (2009.01) |
| *H04W 88/06* | (2009.01) |
| *H04B 7/26* | (2006.01) |
| *H04W 8/26* | (2009.01) |

(52) U.S. Cl.
CPC ............... *H04B 7/15* (2013.01); *H04W 16/26* (2013.01); *H04W 88/10* (2013.01); *H04B 7/2606* (2013.01); *H04W 8/26* (2013.01); *H04W 84/005* (2013.01); *H04W 84/047* (2013.01); *H04W 88/04* (2013.01); *H04W 88/06* (2013.01)

(58) Field of Classification Search
CPC ....... H04B 7/15; H04B 7/2606; H04W 16/26; H04W 88/10; H04W 8/26; H04W 88/04; H04W 84/005; H04W 88/06; H04W 84/047
See application file for complete search history.

(56) References Cited

U.S. PATENT DOCUMENTS

| | | | | |
|---|---|---|---|---|
| 2010/0260096 | A1* | 10/2010 | Ulupinar et al. | 370/315 |
| 2010/0260129 | A1* | 10/2010 | Ulupinar et al. | 370/329 |

(Continued)

FOREIGN PATENT DOCUMENTS

| | | |
|---|---|---|
| WO | WO 2008/084394 A2 | 7/2008 |
| WO | WO 2012/136253 A1 | 10/2012 |
| WO | WO 2012/136254 A1 | 10/2012 |

OTHER PUBLICATIONS

3GPP TS 23.401 V10.4.0 (Jun. 2011), 3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 10), 281 pgs.
3GPP TSG RAN WG3 Meeting #64, San Francisco, USA, May 4-8, 2009, R3-091307, "Discussion on Relay Architecture", Alcatel-Lucent, 5 pgs.
3GPP TSG RAN WG3 #65, Shenzhen, China, Aug. 24-28, 2009, R3-091778, "Mobile relay support analysis", Huawei, 5 pgs.

(Continued)

*Primary Examiner* — Jay P Patel
(74) *Attorney, Agent, or Firm* — Harrington & Smith

(57) ABSTRACT

A method includes controlling one or more radio access connections at a mobile gateway for at least one station associated with a mobile relay system, the mobile relay system providing a plurality of access technologies and being served by one or more donor cellular systems. The method further includes controlling address information of communication on the one or more radio access connections between at least one station and one or more core network elements associated with the one or more donor cellular systems.

29 Claims, 5 Drawing Sheets

(56) References Cited

U.S. PATENT DOCUMENTS

2010/0311419 A1   12/2010   Bi ............................ 455/435.1
2012/0215931 A1*   8/2012   Touati et al. ................ 709/229
2012/0252355 A1*  10/2012  Huang et al. ..................... 455/7
2014/0071884 A1*   3/2014   Sherman ................ H04W 4/22
                                                                     370/315

OTHER PUBLICATIONS

3GPP TSG-RAN WG3 #65bis, Oct. 12-16, 2009, Miyazaki, Japan, R3-092653, "Relationship among relay architectures 1-3", Qualcomm, et al., 4 pgs.

3GPP TSG-RAN WG3 #71, Taipei, Feb. 21-25, 2011, R3-110656, "Requirements for supporting high speed train scenario in LTE", CMCC, 3 pgs.

* cited by examiner

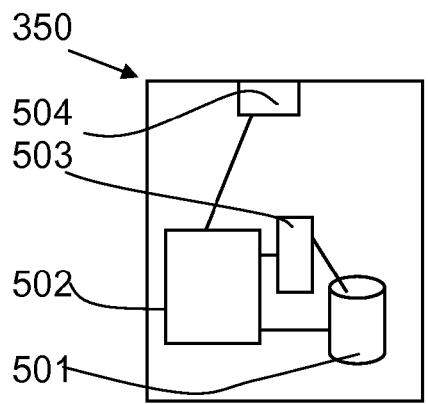

Figure 5

| Controlling one or more radio access connections at a mobile gateway for at least one station associated with a mobile relay system, the mobile relay system providing a plurality of access technologies and being served by one or more donor cellular systems | — 602 |

| Controlling address information of communication on the one or more radio access connections between at least one station and one or more core network elements associated with the one or more donor cellular systems | — 604 |

Figure 6

GATEWAY FUNCTIONALITY FOR MOBILE RELAY SYSTEM

The invention relates to mobile gateway functionality for a mobile relay system and in particular, but not exclusively limited to controlling one or more radio access connections and controlling communication on the one or more radio access connections with the mobile gateway.

An example of a communication system attempting to satisfy increased demands for capacity is an architecture that is being standardized by the 3rd Generation Partnership Project (3GPP). $3^{rd}$ Generation Partnership Project (3GPP) is standardizing an architecture that is known as the long-term evolution (LTE) of the Universal Mobile Telecommunications System (UMTS) radio-access technology. The aim is to achieve, inter alia, reduced latency, higher user data rates, improved system capacity and coverage, and reduced cost for the operator. A further development of the LTE is referred to herein as LTE-Advanced (LTE-A). The LTE-Advanced aims to provide further enhanced services by means of even higher data rates and lower latency with reduced cost. The various development stages of the 3GPP LTE specifications are referred to as releases.

An aspect of controlling communications by mobile devices is known as mobility management. Mobility management provides control of mobile devices in an idle state or a connected state to a serving network moving within a certain area. In cellular systems mobility management is provided by a particular control entity. For example, in LTE each access system is provided with a mobility management entity (MME). A MME control node is involved, among other things, in signalling between core network nodes in case of mobility between 3GPP access networks, idle and active mode user equipment tracking and paging procedures including retransmissions, in bearer activation/deactivation processes and in choosing a serving gateway (SGW) for a user equipment at the initial attach and at time of intra-LTE handover involving core network (CN) node relocation.

Since the new spectrum bands for international mobile telecommunications (IMT) contain higher frequency bands and LTE-Advanced is aiming at a higher data rate, coverage of one base station may be limited due to the high propagation loss and limited energy per bit. Relaying has been proposed as a possibility to enlarge the coverage. Apart from this goal of coverage extension, introducing relay concepts may also help in the provision of high-bit-rate coverage in a high shadowing environment, reducing average radio-transmission power at the user equipment. This may provide improved battery life, enhanced cell capacity and effective throughput. Relaying may also reduce deployment costs of radio access networks (RAN).

Relaying can be provided by entities referred to as relay stations (RSs) or relay nodes (RNs). The relay nodes can be fixed or mobile, for example mounted to a vehicle such as a high-speed train, bus, ferry and the like. In some systems the relay stations may be opportunistically available user equipment/mobile devices that are not owned by the network itself. Relay nodes may be organised into groups, for example into a co-operative cell group (CCG). Mobile relays have been considered e.g. in IEEE 802.16 standards.

A fixed relay node can have a wireless inband or outband backhaul link to a base station such as a donor enhanced node B (DeNB). The backhaul radio link of a fixed relay node can be optimized during installation and communication devices in the coverage area of the relay node can experience a connection quality similar to that in the cell area of the base station. For example the quality of the radio link of the communication device to the relay node can be affected by communication device mobility and position of the communication device in the relay node coverage area. Handling mobility of the communication devices from one donor eNB/RN to another donor eNB/RN can be achieved on an individual basis.

A moving relay node can also have a wireless inband or outband backhaul link to a base station. However, in this case the backhaul link between the relay node and the base station can be subject to issues affected by mobility. For example, the backhaul link can be a radio link featuring full mobility. Communication devices in a moving cell can have similar channel profiles and a static relationship with the moving relay node so long as the communication device moves with the moving relay node. For example, the communication device can remain substantially static with respect to a moving relay node installed on a vehicle so long as the communication device does not leave the vehicle.

One problem of a moving relay system is addressing the need to support all the mobile users within the moving vehicle regardless of their associated home network operator. This is sometimes referred to as the "multi-operator" problem. Indeed in some circumstances a vehicle, such as a train can, carry hundreds or even thousands of passengers, each with one or more cellular devices. This means problems can arise when the many cellular devices associated with the moving relay system travels across many service areas of one or more different cellular networks of one or more different operators.

It is noted that the above discussed issues are not limited to any particular communication environment, but may occur in any appropriate communication system.

STATEMENT OF INVENTION

Embodiments of the invention aim to address one or several of the above issues.

In accordance with an embodiment there is provided a method comprising: controlling one or more radio access connections at a mobile gateway for at least one station associated with a mobile relay system, the mobile relay system providing a plurality of access technologies and being served by one or more donor cellular systems; and controlling address information of communication on the one or more radio access connections between at least one station and one or more core network elements associated with the one or more donor cellular systems.

In a more detailed embodiment the at least one station can be logically connected to the mobile gateway when in communication with the one or more core network elements.

The controlling the address information may comprise assigning address information to at least one station. In particular, the assigning may comprise assigning a local address part configured to address the at least one station within the mobile relay system and to remain static. The assigning may comprise assigning a global address part configured to change dependent on a current core network gateway to which the mobile relay system is connected to. Furthermore, the controlling the address information may comprise mapping address information received from one or more core network elements to assigned local address information of the mobile relay system. The at least one station may be unaware of the connection changes to different core network elements as a result of the mapping of the address information. Additionally or alternatively, the one or more core network elements may be unaware of the mobility of the mobile relay system as a result of the mapping of the address information.

In a more detailed embodiment, the address information can be an IPv4 address or an IPv6 address.

The method may comprise indicating and maintaining IP addresses of the at least one station. The method may comprise translating IP connections of the at least one station.

In another embodiment the mobile gateway can be configured to act as a proxy mobile access gateway and to advertise an address prefix of the at least one station from a home network of the at least one station.

The address information may be used for local addressing in the mobile relay system and wide area addressing in the donor cellular systems. The address information can change without the at least one station being aware of the change.

In one embodiment the address information may comprise a first IP address for the mobile relay system and a second IP address for a wide-area.

The controlling the address information of the communication may comprise determining routing of data to/from the at least one station to/from the core network elements. The determining the routing of the data may be based on pre-stored information associated with the at least one station. The determining the routing of the data can comprise determining a level of quality of service to be provided to the at least one station. The level of the quality of service to be provided to the at least one station may be determine by ticketing information associated with the at least one station. The determining the routing of the data can comprise routing the data via a backhaul connection on the basis of the ticketing information associated with the at least one station. The determining the routing may comprise allocating backhaul capacity for the at least one station on the basis of the ticketing information.

The controlling the connections can comprise controlling admission of the at least one station to the mobile relay system. The controlling the connections can comprise authenticating the at least one station to one or more of the radio access technologies of the mobile relay system. The authentication and admission may be based on a stored identifier associated with the at least one station associated with ticketing information. The stored identifier may be a mobile number of the at least one station.

The controlling the one or more radio access connections can comprise sending cellular call setup information to the at least one station. The cellular call setup information may comprise one or more of the following: paging information, initial resource allocation information for cellular access, cellular bearer configuration information and any other suitable cellular call setup information.

The method can comprise determining system information of donor cellular systems and determining self organising network configurations based on the system information.

The method can comprise establishing a tunnel for multiplexing data to/from the at least one station wherein a first end point of the tunnel is within the mobile relay system and a second end point of the tunnel is between the mobile relay system and the one or more core network elements.

The at least one station may be a mobile station.

The controlling the one or more radio access connections can comprise controlling the mobility management of the user plane and/or the control plane of mobile relay nodes associated with the mobile relay system.

The plurality of access technologies can comprise different or the same access technologies and the one or more donor cellular systems are provided by different or the same operators.

The mobile relay system may be simultaneously connected to a plurality of core network elements and the core network elements are one or more of the following: S-GW and P-GW.

The controlling the connections can comprise enabling IP connections within the mobile relay system without sending traffic to the core network elements.

The method can comprise gathering and updating on or more of the following: system information, policies and rules of the one or more donor cellular systems.

The method can be carried out at a centralised mobile gateway entity or carried out at a plurality of distributed entities each comprising mobile gateway functionality.

The mobile gateway may be collocated with an on-board server configured to provide content services.

In a more detailed embodiment, the mobile relay system can comprise a single Layer 2 network.

In accordance with yet another embodiment there is provided an apparatus comprising: means for controlling one or more radio access connections for at least one station associated with a mobile relay system, the mobile relay system providing a plurality of access technologies and being served by one or more donor cellular systems; and means for controlling address information of communication on the one or more radio access connections between at least one station and one or more core network elements associated with the one or more donor cellular systems.

The apparatus may be a mobile relay gateway.

In accordance with yet another embodiment there is provided an apparatus comprising at least one processor and at least one memory including computer program code, the at least one memory and computer program code configured to with the at least one processor cause the apparatus at least to control one or more radio access connections for at least one station associated with a mobile relay system, the mobile relay system providing a plurality of access technologies and being served by one or more donor cellular systems; and control address information of communication on the one or more radio access connections between at least one station and one or more core network elements associated with the one or more donor cellular systems.

A computer program comprising program code means adapted to perform the methods may also be provided.

Various other aspects and further embodiments are also described in the following detailed description and in the attached claims.

BRIEF DESCRIPTION OF THE DRAWINGS

The invention will now be described in further detail, by way of example only, with reference to the following examples and accompanying drawings, in which:

FIG. 5 shows a schematic representation of a mobile gateway according to some embodiments;

FIG. 6 shows a flow diagram of a method according to some embodiments; and

DETAILED DESCRIPTION

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 4 to assist in understanding the technology underlying the described examples.

Figure 1:
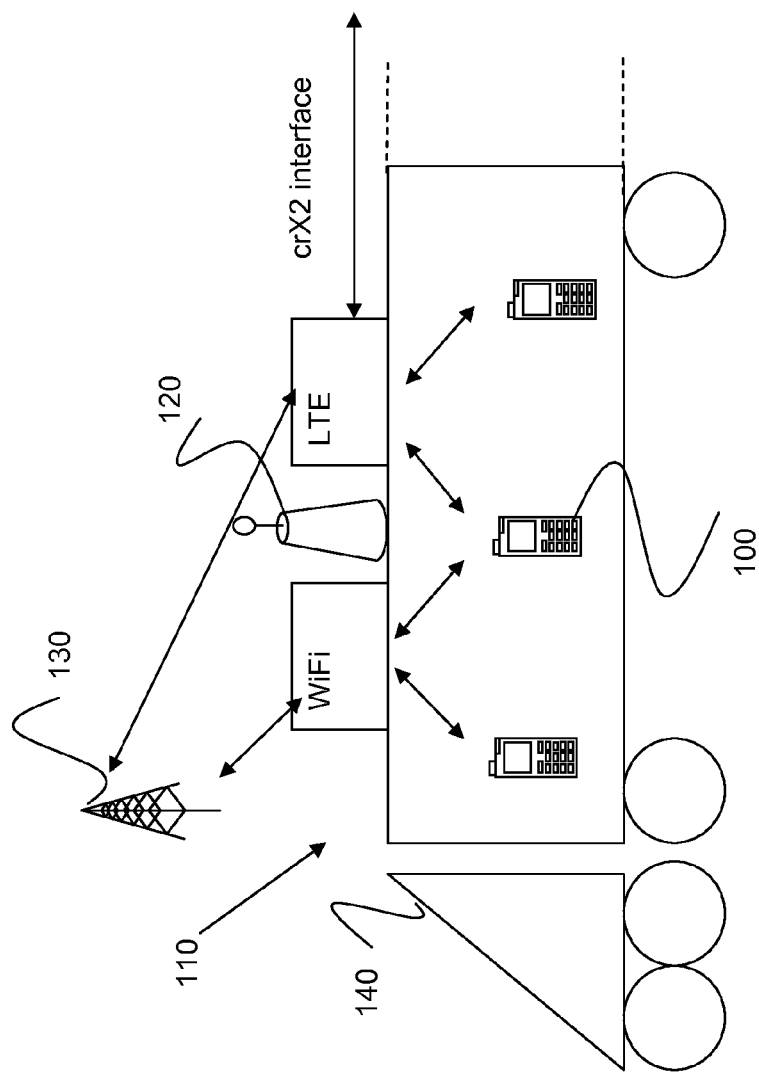
FIG. 1 shows a schematic representation of a mobile relay system according to some embodiments.

FIG. 1 shows a schematic representation of a mobile access system or mobile relay system 110 and part of a radio access network (RAN) including a base station 130. A mobile station 100, mobile communication device or user equipment (mobile station will be used hereinafter for the purposes of simplicity) can be provided with wireless access via at least one relay node 120 or relay station or similar wireless transmitter and/or receiver node of the mobile relay system 110. In FIG. 1 wireless access is provided to the user equipment 110 by the relay node 120 which is in communication with a base station 130. The term base station will be used in the following and is intended to include the use of any of these network access nodes or any other suitable access node. In some embodiments the mobile relay system 110 is located within a vehicle 140 such as a train, bus, ferry or the like.

The mobile relay system 110 is installed in a moving vehicle 140 and is configured to relay communication links between fixed infrastructure and the mobile station 100. The mobile relay system 110 is configured to provide network access to the mobile station 100 in the moving vehicle 140. In this way, the mobile relay system 110 provides access to a moving cell. The mobile relay system 110 can be in communication with a wider cellular communication system.

Cellular access and non-cellular access can be provided by a cell of a cellular system or another system enabling the relay node of the mobile relay system or otherwise to access the communication system. A base station site 130, can provide one or more cells. A base station 130 can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. The mobile relay system 110 and base station 130 may have one or more radio channels open at the same time and may send signals to and/or receive signals from more than one source. The base station 130, provide overlapping cell layers with other base stations and in some embodiments there can be a plurality of cell layers of different sizes and characteristics.

The base station 130 and/or the relay node 120 can typically be controlled by at least one appropriate controller apparatus (not shown) so as to enable operation thereof and management of the mobile station 100 in communication with the base station 130 and/or relay node 120. The control apparatus can typically provided with memory capacity and at least one data processor. The control apparatus can be configured to execute an appropriate software code to provide the control functions. In some embodiments, each base station 130 and relay node 120 can comprise a control apparatus.

Figure 2:
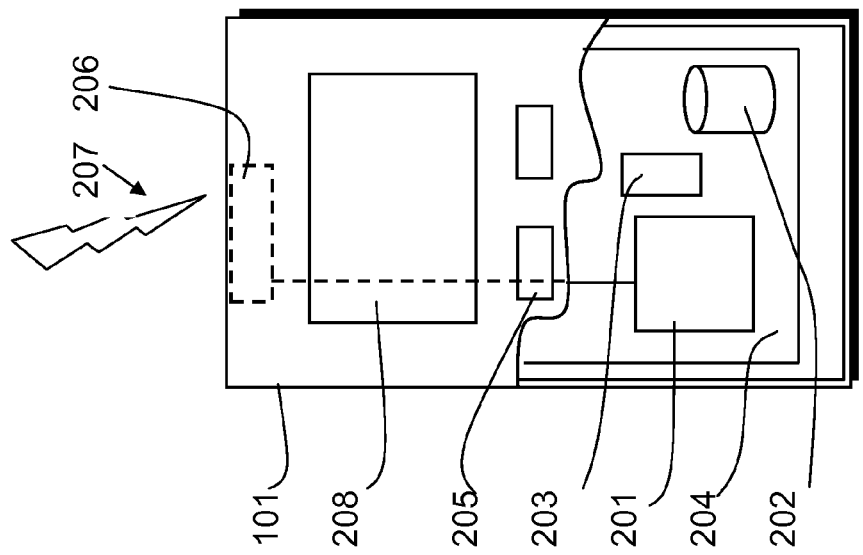
FIG. 2 shows a schematic representation of a mobile station according to some embodiments.

The mobile station 100 will now be described in more detail in reference to FIG. 2. FIG. 2 shows a schematic, partially sectioned view of a mobile station that a user can use for communication. In some embodiments, the mobile station 100 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

A non-limiting example of the recent developments in communication systems is the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access system include those provided by base stations of systems that are based on technologies such as wireless local area network (WLAN) and/or WiMax (Worldwide Interoperability for Microwave Access).

An appropriate mobile station 100 may be provided by any device capable of sending and receiving radio signals. Non-limiting examples include a mobile station (MS) such as a mobile phone or what is known as a "smartphone", a portable computer provided with a wireless interface card or other wireless interface facility, personal data assistant (PDA) provided with wireless communication capabilities, or any combinations of these or the like. A mobile station can provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The mobile station 100 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile station 100.

The mobile station 100 can be also provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. Possible control functions in view of configuring the mobile communication device for reception and processing of information in association with transmission patterns and for muting signals by means of the data processing facility in accordance with certain embodiments of the present invention will be described later in this description.

The user may control the operation of the mobile station 100 by means of a suitable user interface such as key pad 205, voice commands, touch sensitive screen or pad, combinations thereof or the like. A display 208, a speaker and a microphone can be also provided. Furthermore, the mobile station 100 may comprise appropriate connectors (either wired or wireless) to other devices and/or for connecting external accessories, for example hands-free equipment, thereto.

The required data processing apparatus and functions of a base station apparatus, relay node, communication device and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

Figure 3:
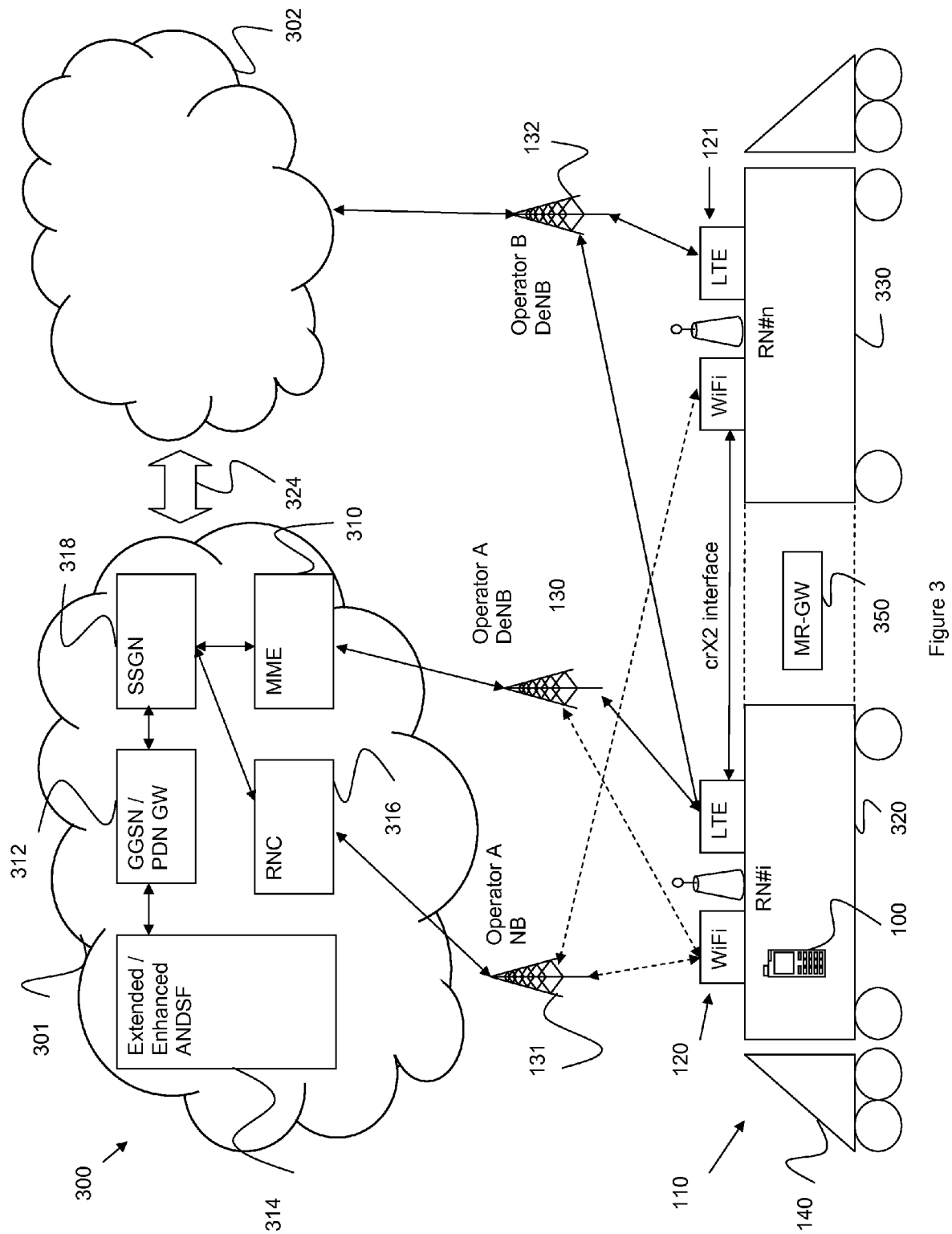
FIG. 3 shows a schematic representation of a communication system comprising a mobile relay system according to some embodiments.
Figure 4:
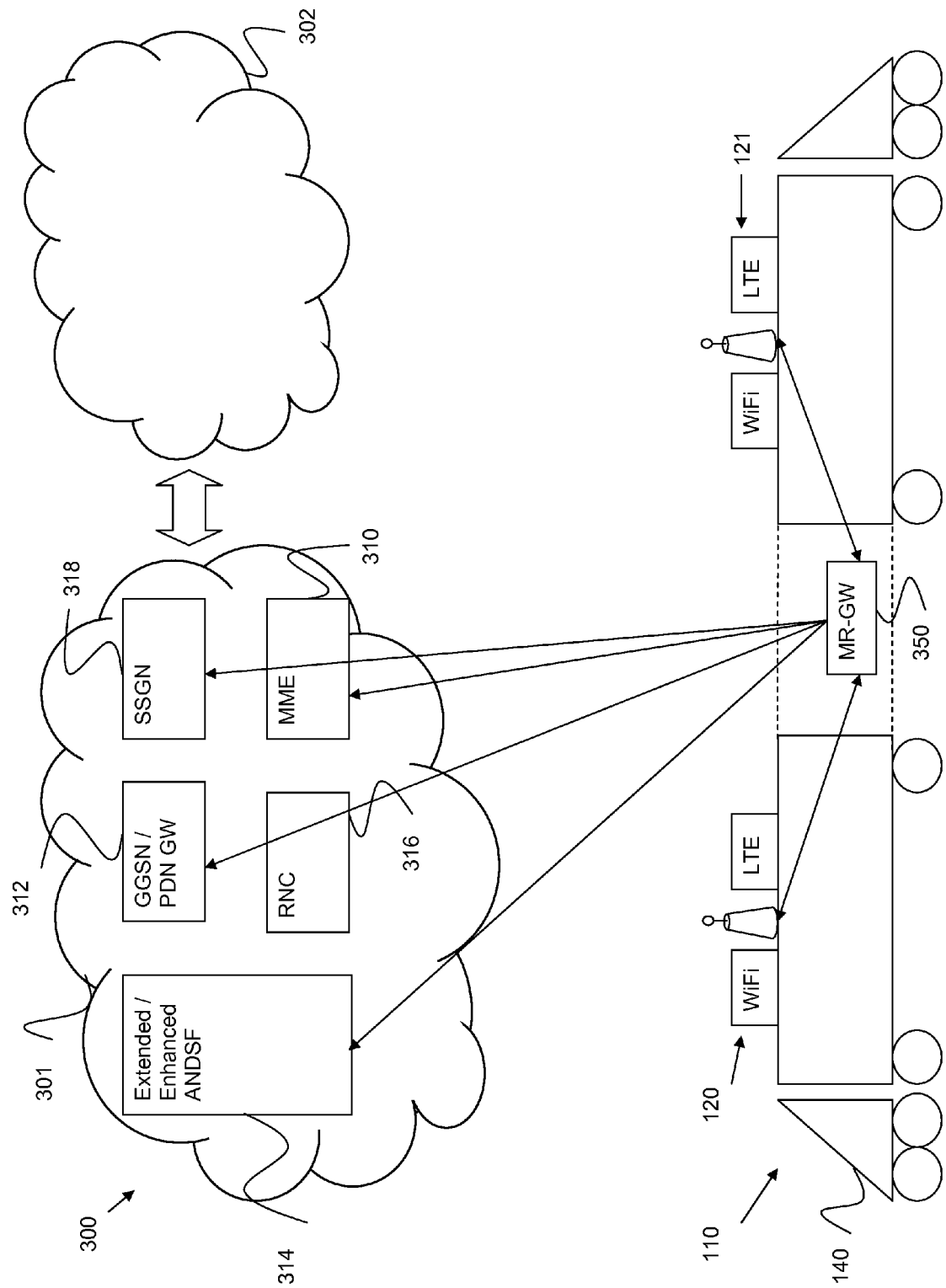
FIG. 4 shows a schematic representation of a communication system comprising a mobile relay system according to some embodiments.

The mobile relay system 110 will now be further described in context to FIGS. 3 and 4 with show a schematic representation of the mobile relay system 110 in a communications system 200.

The mobile relay system 110 can comprise relay nodes 120, 121 (RN) which may be deployed on the vehicle 140 so that the mobile station 100 stays relatively static with respect to the relay nodes 120, 121. The mobile relay system 110 can comprise any number of relay nodes. Typically there can be one relay node per carriage 320, 330 in the example where the vehicle 140 is a train. Of course, the relay nodes of the mobile relay system 110 can be arranged and located in any configuration. In contrast the wireless link between the mobile relay system and the donor cellular systems can suffer from mobility of the mobile relay system 110, especially at high speeds. The link between the relay nodes 120, 121 and the DeNB may be called a "relay link" or a "backhaul link", whereas the link from the relay nodes 120, 121 to the mobile station 100 may be called an "access link". This means that the mobile station 100 aboard the vehicle 140 can be seen as sharing the same mobility characteristics as the mobile relay system 110 from the macro donor system perspective and being substantially stationary within the local cell of the relay node of the mobile relay system 110.

It is common that the speed of the vehicles, such as high speed trains, may be several hundred kilometers per hour. This causes problems with respect to providing and ensuring sufficiently high data rates for the wireless backhaul connections. This is also subject to a fair sharing of limited radio resources of the donor cellular system(s) with other regular mobile users.

Furthermore there is a need to support all mobile users aboard the moving vehicle 140 regardless of their associated home operators. This is also referred to as the "multi-operator problem". The train 140 may be carrying hundreds or even thousands of passengers, all who are potential cellular users. When the train 140 travels across many location tracking areas or service areas of the same or different cellular networks of the same or different operators, then there can be a great burden on the communications system due to the signalling requirements.

Furthermore, in some circumstances a robust cell configuration scheme against all possible changes of donor cellular systems and automatic neighbour-cell relation (ANR) along the travelling road may be desirable. This is because any change in basic cell configurations such as carrier spectrum allocation or physical cell identity (PCID) due to possible conflicts with target donor cells and ANR thereof may result in a cell reset that affect all UEs in the cell.

Some embodiments manage cooperative capabilities of multi-RAT, multi-carrier and/or multi-operator network systems which may be involved in serving a mobile relay system 110. In this way some embodiments provide efficient support of mobile stations within a mobile relay system 110 which can be regularly idle and/or active as well as supporting mobility of resource-consuming wireless backhaul connections of the mobile relay system 110.

LTE-A may be required to provide backward compatibility for LTE, meaning that LTE users should be able to access LTE-A networks. In LTE and LTE-A networks, there may be a functional split between E-UTRAN and serving CN elements such as MME, serving gateway (S-GW) and packet data network gateway (P-GW). Because of the aforementioned issues there may be notable burden on MME, S-GW and P-GW in providing IP connection and mobility management for mobile stations associated with the mobile relay system 110 if connections of these mobile stations are still handled individually from CN perspective as in current E-UTRAN with fixed relays. This is because there may be many changes with serving MME, S-GW or P-GW along the travelling route of the train carrying the MR system, further complicated when having possible multi-operator multi-RAT donor systems.

The mobile relay system 110 of some embodiments can be in communication with the wider communications system 300 via one or more base stations 130, 131, 132. The wider communications system can comprise a plurality of networks. FIGS. 3 and 4 show a first and second network 301, 302 representing networks of different operators. Indeed some base stations 130 and 131 are associated with the first network 301 of a first operator and another base station 132 is associated with the second network 302 of a second operator. In some embodiments, the first network 301 of the first operator comprises a plurality of radio access technologies, examples of which are described hereinafter. The first and second networks 301, 302 can communicate with each other via a communication link 324.

In some embodiments, the relay nodes 120, 121 can comprise a wireless transceiver providing an out-band wireless access for the terminals in the coverage area of the relay node 120, 121. The out-band wireless access may also be called non-cellular radio access as the frequency band utilised by the out-band wireless access is different compared to cellular services. A non-limiting example of a non-cellular or outband access type is Wireless Local Area Network (WLAN) or WiFi.

In an embodiment, the relay nodes 120, 121 may additionally or alternatively comprise a cellular transceiver providing a cellular wireless access for the terminals in the coverage area of the mobile relay. The access technology may be LTE or LTE-A, for example. The radio access technology can in other embodiments be any other suitable radio access technology, such as 3G. The relay node 120, 121 may have the full functionality of e.g. LTE-A eNode B towards the mobile station, but it is attached to the network side using a mobile wireless backhaul.

This means in some embodiments the mobile station 100 can have dual in band/out band radio access provided by an out-band wireless network and an in-band wireless cellular network.

FIG. 3 shows the cellular connections between the relay nodes 120, 121 of the mobile relay system 110 and the first and second networks 301, 302 with solid lines. Non-cellular connections between the relay nodes 120, 121 and the first and second networks 301, 302 are shown with dotted lines. FIG. 3 shows simplified embodiments for the purposes of clarity. In other embodiments the arrangement can comprises more networks, more operators, more relays nodes, more base stations and more cells etc. The shape and size of the cells (which have not been shown in FIG. 3) can vary and overlap. Furthermore, it will be appreciated that different radio access technologies can be provided.

In some embodiments the first network 301 comprises 3G and LTE-A radio access technologies. In some embodiments the first and second networks both can comprise one or more radio access technologies. FIG. 3 depicts the first network 301 comprising 3G radio access technology comprising a NodeB base station 131 connected to a radio network controller (RNC) 316. FIG. 3 also shows that the first network 201 comprises an LTE-A or an LTE radio access technology comprising an eNodeB base station 130 connected to a mobility management entity MME 310.

The core networks 301, 302 of the first and second operators can comprise the following elements: an MME (Mobility Management Entity) 310, an SAE GW (SAE Gateway) 312, an ANDSF (Access Network Discovery and Selection Function) 314 and Serving GPRS Support Node, SGSN 318. It should be appreciated that a communication system may also comprise other core network elements besides the illustrated such as a Gateway Mobile Service Switching Centre, GMSC, and an OAM (Operations, Administration and Management system). Furthermore, not all systems necessarily comprise all the above illustrated elements.

The base stations 130, 132 that may also be called eNodeBs (Enhanced node Bs) of a communication system may host the functions for Radio Resource Management: Radio Bearer Control, Radio Admission Control, Connection Mobility Control, Dynamic Resource Allocation (scheduling). This applies to LTE or LTE-A based systems. For the 3G based systems the Radio Network Controller 316 may comprise some of the above mentioned functions. The MME 310 is responsible for distributing paging messages to the eNodeBs 130, 132. The SAE GW 312 is an entity configured to act as a gateway between the first and/or second networks 301, 302 and other parts of a communication network such as the Internet for example. The SAE GW 312 may be a combination of two gateways, a serving gateway (S-GW) and a packet data network gateway (P-GW).

The ANDSF 316 may be a network-protocol functionality which is configured to assist user equipment of the network to make mobility decisions between 3GPP and non-3GPP access technologies on the basis of the network operator policy. For example, the ANDSF enables user equipment supporting multiple access technologies to select most suitable access network in the area where different access technologies such WLAN or WiMAX are available.

In some embodiments the vehicle 140 comprises one or more sections 320, 330. Each section can comprise a relay node 120, 121. The relay node 120, 121 may be a dual function relay providing both LTE/LTE-A access and non-cellular wireless access. Alternatively in some other embodiments the relay nodes 120, 121 may offer only non-cellular access for the passengers of the vehicle 140. The relay nodes 120, 121 may be connected together with a crX2 interface 322.

In some embodiments, the relay nodes 120, 121 of the mobile relay system 110 are configured to operate in co-operation. The relay nodes may communicate with each other using the interface 322 regarding the wireless access services provided by the relay nodes 120, 121 and the backhaul connections of the relay nodes 120, 121.

In some embodiments there may be provided a gateway entity 350 connected to the relay nodes 120, 121 of the mobile relay system 110. The gateway entity, or mobile relay gateway (MR-GW) 350 is configured to co-ordinate and control the capabilities and connectivity of the mobile relay system 110 with the core network(s) 300.

The connectivity between the mobile relay gateway 350 and the core network 301 will be described in reference to FIG. 4. FIG. 4 is the same as FIG. 3, but for the purposes of clarity, the base stations 130, 131, 32 and the communication links between them and the relay nodes 120, 121 and networks 301, 302 have been omitted. FIG. 4 shows the communication links between the mobile relay gateway 350 and the MME 310, SSGN 318, GGSN/P-GW 312 and ANDSF 314. It should be appreciated that a communication system may also comprise other core network elements besides the illustrated such as a Gateway Mobile Service Switching Centre, GMSC, and an OAM (Operations, Administration and Management system). Furthermore, not all systems necessarily comprise all the above illustrated elements.

The mobile relay gateway 350 will now be discussed with reference to FIG. 5, which shows a schematic representation of the mobile relay gateway 350. The mobile relay gateway 350 can typically comprise least one appropriate controller apparatus as shown in FIG. 5 so as to enable operation thereof and management of the mobile station 100 and mobile relay system 110 in communication with the first and second networks 301, 302. The mobile relay gateway 350 can be interconnected with other control entities. For example, in some embodiments the functionality of the mobile relay gateway can be carried out by a plurality of relay nodes 120, 121 in the mobile relay system 110. Alternatively, in other embodiments the mobile relay gateway 350 can be a standalone entity located on the moving vehicle. In some embodiments, the mobile relay gateway 350 is located with an on-board server which can provide local services to the mobile relay system 110. For example the mobile relay gateway 350 can control the provision of in-vehicle services, e.g. streaming media content such as video, being provided to mobile stations 100 from the on-board server.

The mobile relay gateway 350 can typically provided with memory capacity 501 and at least one data processor 502, 503 and an input/output interface 504. The mobile relay gateway 350 and functions may be distributed between a plurality of control units. The control apparatus 300 can be configured to execute an appropriate software code to provide the control functions. In some embodiments, each relay node 120, 121 can comprise a control apparatus 300 for performing some or all of the functionality of the mobile relay gateway 350. The mobile relay gateway 350 can be configured to provide control functions in association with control and coordination of communication between the mobile station 100 and/or the relay nodes 120, 121 and the networks 301, 302 by means of the data processing facility in accordance with certain embodiments described herein.

The functionality of the mobile relay gateway 350 will now be discussed in reference to FIG. 6. FIG. 6 shows a flow diagram of the mobile relay gateway operating according to some embodiments.

The mobile relay gateway 350 is configured to control one or more radio access connections at a mobile gateway for at least one station associated with a mobile relay system, the mobile relay system providing a plurality of access technologies and being served by one or more donor cellular systems as shown in block 602. In some embodiments the mobile relay gateway 350 can comprise any means suitable for controlling one or more radio access connections. The at least one station can be a mobile station 100 which is connected to the mobile relay system 110 via the relay nodes 120, 121. As mentioned previously, the mobile relay system 110 provides a plurality of radio access technologies such as LTE-A, 3G and WiFi. In some embodiments the mobile relay gateway 350 can coordinate communication between the mobile station 100 and a fixed network where there are one or more of the following: a plurality of operators, a plurality of radio access technologies; and a plurality of donor base stations. This means that the mobile relay gateway 350 mirrors functionality which has previously been carried out by the core network. In this way the mobile relay gateway 350 can make decisions and carry out management operations without contacting the core network. This means the mobile relay system 350 does not need to contact the core network as often and can save radio resources.

The mobile relay gateway 350 is also configured to control address information of communication on the one or more radio access connections between the at least one station and one or more core network elements associated with the one or more donor cellular systems as shown in block 604. In some embodiments, the mobile relay gateway 350 can comprise any means suitable for controlling communication on the one or more radio access connections. In some embodiments the mobile station 100 remains logically connected to the mobile relay gateway 350. In this way the mobile relay gateway 350 hides the mobility of the mobile relay system 110 from the core networks 301, 302 and the mobile station 100. This reduces excessive mobility handling in the core network for similar or identical mobility needs. Indeed, the mobile relay gateway 350 is configured to control mobility management for both user and control plane of the mobile relays nodes 120, 121. Furthermore the mobile relay gateway 350 can provide support for in-vehicle local services, distributing functions to relay nodes, IP address allocation, admission and control, processes concerning self organising networks (SON) and idle mobility management and location update with home/visited networks. Furthermore the mobile relay gateway 350 may be provided as an integrated mobile relay part of cellular networks.

In this way there can be less burden on the core network nodes in providing mobility management for users on board the vehicle. Also, the need for control and management per individual UE can be reduced. Furthermore there may be no significant changes to current LTE network architectures and this provides backward compatibility for previous releases of LTE.

The abovementioned functionalities controlled by the mobile relay gateway 350 will now be discussed in further detail.

In some embodiments, the mobile relay gateway 350 is configured to control the connection by assigning and maintaining address information for the mobile station 100. In some embodiments the mobile relay gateway 350 is configured to map address information of the mobile station 100 received from the core network 301, 302, with the address information of the mobile station 100 associated with the mobile relay system 110. In this way the mobile relay gateway 350 is configured to map and translate address information of the mobile station 100 to hide mobility issues from the mobile station 100 arising from changing gateways, such as S-GW or P-GW, in the core network 301, 302. In some embodiments, the mobile relay gateway 350 may be configured to map address information of the mobile station 100 associated with the mobile relay system 110 to the address information of the mobile station 100 provided or used by the core network 301, 302. In some embodiments once a mobile station 100 is active and aboard the vehicle and has been assigned an address by the mobile relay gateway 350, the address may be kept and used by the mobile station 100 as long as the mobile station remains aboard the vehicle 140. The mobile station 100 can use the assigned address regardless of changes of gateways in the core network as the vehicle 140 travels along a route. In some embodiments the address information is Internet Protocol (IP) address information.

In some embodiments, the mobile relay system 110 can be connected to and served by multiple donor cellular systems of the same or different radio access technologies of the same or different operators. In this way the mobile relay system 110 can be connected to multiple S-GWs and P-GWs simultaneously. The S-GWs and P-GWs connected to the mobile relay system can change over time due to the movement of the mobile relay system 110.

In some embodiments the mobile relay gateway 350 is configured to route IP traffic of the mobile station 100 to one or more changeable S-GWs and P-GWs. This means that the IP address information with respect to the mobile relay gateway 350 and the core network, the mobile station 100 can have one or more changeable IP addresses. The mobile relay gateway 350 is configured to keep any changes to the IP addresses of the mobile station between the mobile relay system 110 and the core network 301, 302. This means that from the perspective of the mobile station 100, the address information of the mobile station 100 remains the same irrespective of routing changes between the mobile relay system 110 and the core network 301, 302.

In some embodiments the mobile relay gateway 350 is configured to assign one or more parts of the address information based on different criteria. For example, the mobile relay gateway 350 can assign a first part of the address information providing local address information. That is, the local part of the address information provides address information of the mobile station 100 in the mobile relay system 100. The mobile relay gateway 350 can also assign another part of the address information providing core network routing information. In this way at least a part of the address information can remain constant and the mobile relay gateway 350 can assign, indicate and maintain the local part of the address information for the mobile station 100 and the core network 301, 302. Alternatively or additionally the mobile relay gateway 350 is configured to assign, indicate and maintain IP addresses for the mobile stations 100. Furthermore, the mobile relay gateway 350 is configured to map and translate IP connections for mobile stations 100.

Furthermore the mobile relay gateway 350 can provide local IP connections, also known as local IP breakout, using the local part of the address. This means that the local IP connections can be made without signalling the core network nodes.

In some embodiments, the address information for the mobile station 100 is implemented using IPv6 addressing. The mobile relay gateway 350 is configured to keep the link-local part of the IP address the same and to modify the global part of the IP address according to changing S-GWs and P-GWs.

When the mobile relay gateway 350 assigns address information, for example IP addressing, in some embodiments there can be some special addressing space allocated for such populated public transportation systems (trains, ships, ferries). This can provide certain implicit indications which can be seen from the address information being used. Further, depending on who is the actual operator of the transportation system, e.g., whether the transportation company or the cellular operator or a third party or in some case a mixed of previous options, the mobile relay gateway 350 should be able to use suitable IP addressing space for IP address assignment and if needed then communicate/indicate that to the involved parties. This can also be used for the global address part as well.

In some embodiments the mobile relay gateway 350 can provide an indication of the IP address to the mobile station 100. The mobile station 100 can follow standard procedures upon getting access and register to the mobile relay system 110.

Furthermore in some embodiments local IP connectivity can be implemented using IPv6 or IPv4 addressing. The relay nodes 120, 121 of the mobile relay system can be configured to be L2 switch devices for the in-vehicle wireless local area network (LAN) and also for the LTE radio access interface. This means that communication between mobile stations within the same vehicle can be performed within the mobile relay system 110. In some embodiments the internal vehicle network can be configured as a single L2 network. This means that user plane handovers could be handled on the L2 layer so that Sxx tunnel switching could be avoided. In this way, the operator of the vehicle mobile relay system 110 may not have to interact with another operator who owns the Sxx functionality. In some embodiments, direct communication within the vehicle 140 between hosts and local services can use IP addresses from the same IP address base. In some embodiments private IPv4 and local link IPv6 addresses can be used.

However, if a mobile station 100 requires wide area connection public access is needed. In some embodiments the mobile relay gateway 350 is configured to act as a proxy IPv6 mobile access gateway (MAG) and advertised the prefix from the home network P-GW to the mobile station 100. The mobile relay gateway 350 acting as the MAG can then hide the gateway and other changes to the IP address due to the mobile relay system 110 movement. This means that the mobile station 100 does not need to have a mobile IP (MIP) stack. However the P-GW in the home network has to have local mobility anchor (LMA) functionality. In this case, the local-link IPv6 addresses can have a 1:1 mapping on to cell-specific radio network temporary identifier (C-RNTI) if the mobile relay gateway 350 uniquely assigns them to radio resource control (RRC) connected mobile stations 100 in the mobile relay system 100. In some embodiments, the C-RNTIs and local-link IPv6 address information can be configured for possible inter-changeable use in addressing the mobile stations of the air by both the mobile station side and the network side.

As mentioned above, the local part of the address information or link local address is to uniquely identify mobile stations 100 and/or users aboard the vehicle 140 among themselves. In some embodiments there is provided a 2 byte local link address which can be used for addressing the mobile station 100/user on the radio access network and local system, inter-changeable with C-RNTI whenever needed and, optionally, if the security is not compromised. In this case, the eNB 130 or relay node 120 needs to know about the local link address of the users aboard. The mobile relay gateway 350 is configured to forward the local link address information to the eNB 130 and the relay nodes 120. In the case where the C-RNTI and local link address are not the same, the mobile relay gateway 350 forwards these to the relay nodes 120 and the eNB 130. The local link address information in some embodiments should be unique among the users aboard associated with the mobile relay system 110.

In some embodiments IPv4 addressing information can be used and the mobile relay gateway 350 can be configured to perform network address translation (NAT). In particular NAT may be required if the same IPv4 address is used for both local and wide area access. Additionally or alternatively, the mobile relay gateway 350 can be configured to assign 2 IP addresses to the mobile station 100. A first address can be used for private local access and a second one for public mobile wide area access. In some embodiments the mobile relay gateway 350 can assign two IP addresses for each mobile station 100 in the mobile relay system 110. The mobile relay gateway 350 in some embodiments can be configured to perform specific NAT operations for each radio access technology (WiFi, 3G etc). In some embodiments, the IP address does not change from the perspective of the mobile station 100 during mobility. Additionally or alternatively the IP address for the mobile station 100 can be changeable without the mobile station 100 being aware of it. For example, the mobile relay gateway 350 can be configured to provide suitable mapping and translation of the address information to maintain connections between the mobile station 100 and the core network irrespective of any changes to the address information of mobile station 100 or changes to the connection between the mobile station 100 and core network nodes.

Where the mobile station 100 can support two IP addresses for wide-area and local access, the mobile station 100 and also the mobile relay gateway 350 are configured to determine when and which of the two IP addresses are to be adopted for use. In some embodiments, at least all the WiFi traffic can be routed via the mobile relay gateway 350. Additionally or alternatively the WiFi relay nodes 131 can be configured to be IP address "aware" and configured to perform IP routing to some extent. In other embodiments there may be cellular access traffic with tunnelling setup for each bearer service wherein routing control based on tunnelling ID mapping is sufficient to route the traffic in the mobile relay system 110.

In some other embodiments the mobile relay gateway 350 is configured to provide admission control for all on-board local radio access services. In some embodiments the mobile relay gateway 350 is configured to control access to the out-band radio access technologies, but in other embodiments the mobile relay gateway 350 can be alternatively or additionally configured to control access to the in-band radio access technologies provided in the vehicle 140.

The mobile relay gateway 350 can also assist in authentication and admission control for on-demand paid in-band cellular access services. In some embodiments the mobile relay gateway 350 is configured to fast authenticate a mobile station 100 accessing the local mobile relay system 110 using at least an out-band radio access technology based on passenger information. For example, the mobile relay gateway 350 can determine authentication based on ticketing information. In some embodiments the mobile relay gateway 350 can correlate a ticket number and/or a seat number with a pre-stored identifier such as an authentic mobile number. The pre-stored identifier may be stored when the ticket was booked, for example. The mobile relay gateway 350 can then assist in speeding up cellular authentication once the mobile station 100 has accessed the mobile relay system 110 locally using the out-band and/or the in band radio access technology of the mobile relay system 110. In some embodiments the mobile relay gateway 350 can communicate with a cellular network for the mobile station 100. In response to the communication with the cellular network for the mobile station, the mobile relay gateway 350 can decide to allocate backhaul capacity to serve the mobile station 100 in advance. In some embodiments, the mobile relay gateway 350 can allocate the backhaul capacity as soon as the mobile station 100 interacts with the mobile relay system 110, but before the mobile station requires the backhaul capacity.

In another embodiment the mobile relay gateway 350 can detect and serve any end to end call of mobile stations 100 aboard. In this way, the mobile relay gateway 350 can keep calls which start and terminate within the mobile relay system 110 within the local system. The mobile relay gateway 350 can be configured to act as a multi-operator local proxy agent/server for serving MME/S-GW as well as a registration server for mobile stations 100 aboard. In some embodiments, the mobile relay gateway 350 can communicate with the mobile station 100 for the cellular call set up using the out-band radio access technologies of the mobile station 100 at least for local on-board services. In particular, the mobile relay gateway 350 can perform one or more of the following with the mobile station 100 for setting up a call: paging, initial resource allocation for cellular access, cellular bearer configuration etc).

The mobile relay gateway 350 can also control the local traffic within the mobile relay system according to one or more criteria. For example, the mobile relay gateway 350 can be configured to treat, distribute or route traffic in the mobile relay system 110 according to passenger details, such as ticketing information. In some embodiments, the mobile relay gateway 350 can perform quality of service differentiation within the mobile relay system 110 and the over established backhaul links of the mobile relay system 110. The mobile relay gateway 350 can perform the service differentiation for local services and global services. In some embodiments the mobile relay gateway 350 can perform the differentiation of the quality of service for different mobile stations 100 based on ticketing information of the passenger. This means for example that the mobile relay gateway 350 can determine depending on the whether the mobile station 100 is associated with a first class ticket or an economy ticket the quality of service to be provided to the mobile station. The mobile relay gateway 350 may mark differentiated services code point DSCP of IP traffic of the mobile station 100 and route the IP traffic of the mobile station via a reliable backhaul connection if the mobile station 100 is associated with a particular ticket type or particular passenger information.

In some embodiments, the mobile relay gateway 350 is configured to perform functionality associated with self organizing networks (SON) and OAM. The mobile relay gateway 350 is configured to gather and update system information, policies and rules of donor cellular systems in terms of policy charging and rules functions (PCRF) coupled with flexible spectrum usage (FSU) and SON. The mobile relay gateway 350 can be also configured to store equivalent PCRF and OAM information of the local train company. The mobile relay gateway 350 can then determine SON configurations for the mobile relay system 110 and indicate that to the donor cellular systems along the travelling route. This can help reduce the need of decision making and configuration signalling from the core network to the mobile relay system 110.

Furthermore in some embodiments the mobile relay gateway 350 is configured to set up and maintain one or more aggregated backhaul connections or connection groups toward suitable cellular networks by co-ordinating and controlling one or more relay nodes 120, 121 of the mobile relay system. The mobile relay gateway 350 can also control local cells' configuration, operation and cooperation and issue backhaul connection management related requests such as backhaul link addition/release request, handover request, capacity request to the selected donor network.

Figure 7:
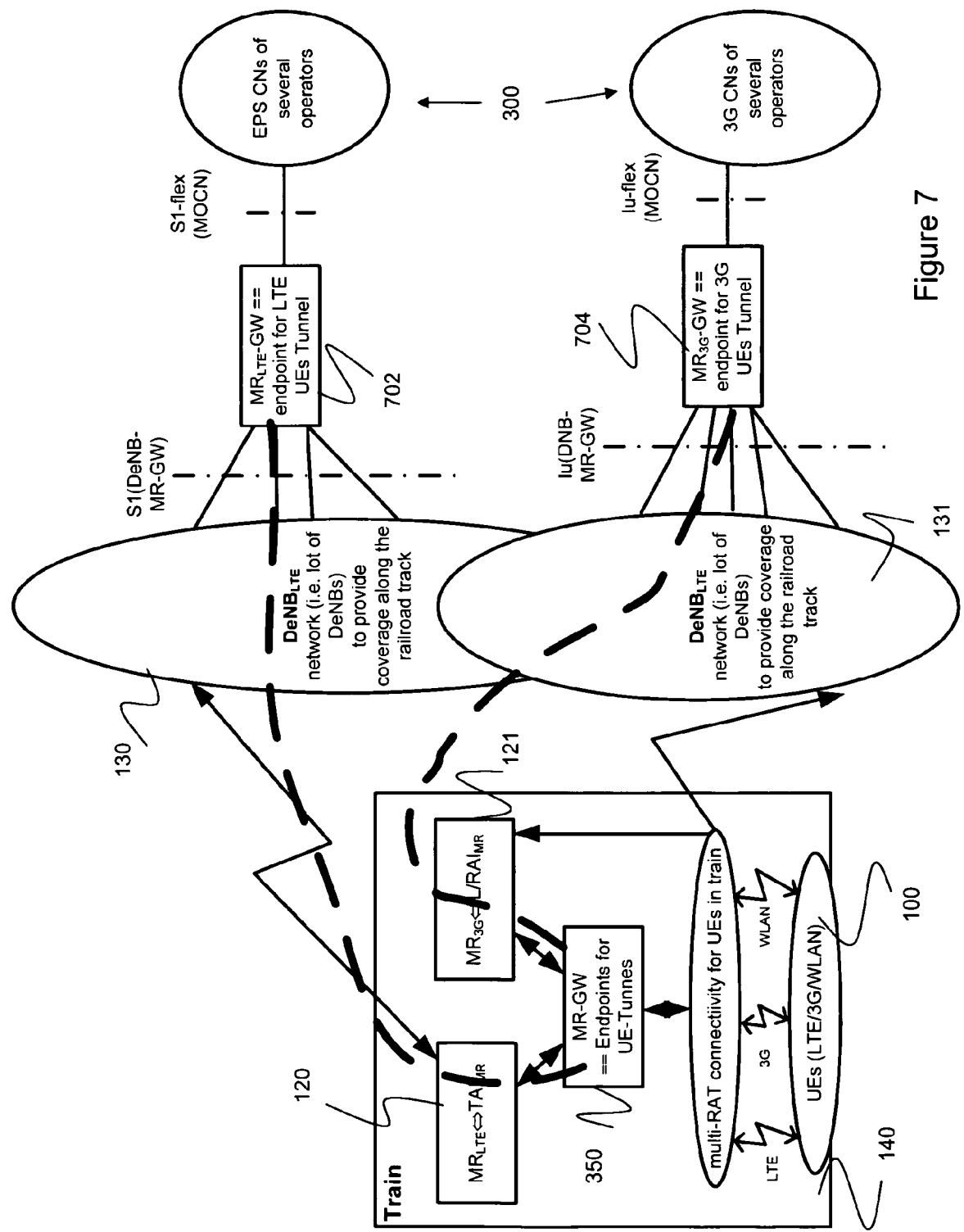
FIG. 7 shows a schematic representation of a communication system comprising a mobile relay system according to some embodiments.

In another embodiment the mobile relay gateway 350 functionality can be divided between the mobile relay system 110 and the core network 300. This concept will be further discussed with reference to FIG. 7 which shows a schematic representation of a mobile relay system in a communication network. FIG. 7 shows a similar arrangement to that shown in FIGS. 3 and 4. In particular two relay nodes are shown. A first relay node is an LTE-A relay node 120 and a second relay node 121 is a 3G relay node.

Within the LTE system, the train 140 stays in the same tracking area as seen by the MMEs from one or more operators. Within the 3G system the train 140 stays within the same location/routing area for the MSC/SGSN.

The functionality of the mobile relay gateway 350 is split such that there is a first part located within the mobile relay system 110, similar to the embodiments discussed with reference to FIGS. 3 and 4. Furthermore a second part 702, 704 is located on the network side in the LTE system or the 3G system. In some embodiments the second part 702, 704 of the mobile relay gateway located between the base station 130, 131 and the core networks 300 of either the 3G or the LTE systems. The LTE second part 702 is connected to the DeNB 130 via an S1 link (DeNB-MR-GW) and connected to the core network with an S1-flex link (MOCN). The 3G second part 704 is connected to the DNB 131 via a Iu link (DNB-MR-GW) and connected to the core network with an Iu flex link (MOON).

In some embodiments the first part and second parts of the mobile relay gateway 350 establish a UE tunnel mechanism therebetween. In this way the mobile relay gateway 350, 702, 704 are the end points of the UE tunnel. The mobile relay gateway functionality can hide the mobility towards the core network and the mobile stations 100 appear to stay in the same TAI, LAI or RAI from the perspective of the core network. In some embodiments the data from the mobile stations 100 are multiplexed within a single tunnel between the gateway first and second parts 350, 702, 704. In some embodiments the mobile relay gateway first and second parts 350, 702, 704 are configured to establish a plurality of tunnels. In some embodiments the data within the different tunnels can be differentiated on the basis of quality of service.

It is noted that whilst embodiments have been described in relation to LTE-Advanced, similar principles can be applied to any other communication system. Also, instead of carriers provided by a base station a carrier comprising component carriers may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

Furthermore, whilst embodiments have been described in relation to relay nodes, similar principles can be applied to any station being handed over between other stations. For example there are some embodiments wherein the aforementioned principles can be applied to mobile stations, such as user equipments or communication devices or any access node such as base stations.

It is also noted herein that while the above describes exemplifying embodiments of the invention, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more of any of the other embodiments previously discussed.

The invention claimed is:

1. A method comprising:
controlling one or more radio access connections at a mobile gateway for at least one station associated with a mobile relay system, the mobile relay system providing a plurality of access technologies and being served by one or more donor cellular systems; and
controlling, by the mobile gateway communicating at least with the mobile relay system, address information of communication on the one or more radio access connections between the at least one station and one or more core network elements associated with the one or more donor cellular systems.

2. A method according to claim 1 wherein the at least one station is logically connected to the mobile gateway when in communication with the one or more core network elements.

3. A method according to claim 1 wherein the controlling the address information comprises assigning address information to at least one station.

4. A method according to claim 3 wherein the assigning comprises assigning a local address part configured to address the at least one station within the mobile relay system and to remain static.

5. A method according to claim 3 wherein the address information comprises both a local address part and a global address part, and wherein the assigning comprises assigning the global address part configured to change dependent on a current core network gateway to which the mobile relay system is connected to.

6. A method according to claim 3 wherein the controlling the address information comprises mapping address information received from one or more core network elements to assigned local address information of the mobile relay system.

7. A method according to claim 3 wherein the mobile gateway is configured to act as a proxy mobile access gateway and to advertise an address prefix of the at least one station from a home network of the at least one station.

8. A method according to claim 3 wherein the address information is used for local addressing in the mobile relay system and wide area addressing in the donor cellular systems.

9. A method according to claim 1 wherein the controlling the address information of the communication comprises determining routing of data to/from the at least one station to/from the core network elements.

10. A method according to claim 9 wherein the determining the routing of the data is based on pre-stored information associated with the at least one station.

11. A method according to claim 1 wherein the controlling the one or more radio access connections comprises sending cellular call setup information to the at least one station.

12. A method according to claim 11 wherein the cellular call setup information comprises one or more of the following: paging information, initial resource allocation information for cellular access, cellular bearer configuration information and any other suitable cellular call setup information.

13. A method according to claim 1 wherein the method comprises establishing a tunnel for multiplexing data to/from the at least one station wherein a first end point of the tunnel is within the mobile relay system and a second end point of the tunnel is between the mobile relay system and the one or more core network elements.

14. A method according to claim 1 wherein the controlling the one or more radio access connections comprises controlling the mobility management of the user plane and/or the control plane of mobile relay nodes associated with the mobile relay system.

15. A non-transitory computer readable medium comprising program code which when loaded into a processor controls the processor to perform the method steps of claim 1.

16. An apparatus comprising
at least one processor and at least one non-transitory memory including computer program code, the at least one non-transitory memory and computer program code configured to with the at least one processor cause the apparatus at least to:
control one or more radio access connections for at least one station associated with a mobile relay system, the mobile relay system providing a plurality of access technologies and being served by one or more donor cellular systems; and
control, by the mobile gateway communicating at least with the mobile relay system, address information of communication on the one or more radio access connections between the at least one station and one or more core network elements associated with the one or more donor cellular systems.

17. An apparatus according to claim 16 wherein the at least one station is logically connected to the mobile gateway when in communication with the one or more core network elements.

18. An apparatus according to claim 16 wherein the controlling the address information comprises assigning address information to at least one station.

19. An apparatus according to claim 18 wherein assigning the address information to the at least one station comprises assigning a local address part configured to address the at least one station within the mobile relay system and to remain static.

20. An apparatus according to claim 18 wherein the address information comprises both a local address part and a global address part, and wherein the assigning comprises assigning the global address part configured to change dependent on a current core network gateway to which the mobile relay system is connected to.

21. An apparatus according to claim 18 wherein controlling the address information comprises mapping address information received from one or more core network elements to assigned local address information of the mobile relay system.

22. An apparatus according to claim 18 wherein the mobile gateway is configured to act as a proxy mobile access gateway and to advertise an address prefix of the at least one station from a home network of the at least one station.

23. An apparatus according to claim 18 wherein the address information is used for local addressing in the mobile relay system and wide area addressing in the donor cellular systems.

24. An apparatus according to claim 16 wherein controlling the address information of the communication comprises determining routing of data to/from the at least one station to/from the core network elements.

25. An apparatus according to claim 24 wherein determining the routing of the data is based on pre-stored information associated with the at least one station.

26. An apparatus according to claim 16 wherein controlling the one or more radio access connections comprises sending cellular call setup information to the at least one station.

27. An apparatus according to claim 26 wherein the cellular call setup information comprises one or more of the following: paging information, initial resource allocation information for cellular access, cellular bearer configuration information and any other suitable cellular call setup information.

28. An apparatus according to claim 16 wherein the at least one processor and the at least one memory including computer program code are further configured to cause the apparatus to at least to
establish a tunnel for multiplexing data to/from the at least one station wherein a first end point of the tunnel is within the mobile relay system and a second end point of the tunnel is between the mobile relay system and the one or more core network elements.

29. An apparatus according to claim 16 wherein controlling the one or more radio access connections comprises controlling the mobility management of the user plane and/or the control plane of mobile relay nodes associated with the mobile relay system.

* * * * *